(12) United States Patent
Harsila

(10) Patent No.: US 9,651,764 B2
(45) Date of Patent: May 16, 2017

(54) INTERCHANGEABLE REFLECTIVE ASSEMBLY FOR A CHROMATIC RANGE SENSOR OPTICAL PEN

(71) Applicant: Mitutoyo Corporation, Kanagawa-ken (JP)

(72) Inventor: Scott Allen Harsila, Bothell, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 655 days.

(21) Appl. No.: 14/169,023

(22) Filed: Jan. 30, 2014

(65) Prior Publication Data

US 2015/0211850 A1  Jul. 30, 2015

(51) Int. Cl.
| | | |
|---|---|---|
| G01C 3/08 | (2006.01) | |
| G02B 21/00 | (2006.01) | |
| G02B 7/182 | (2006.01) | |
| G01B 21/04 | (2006.01) | |

(52) U.S. Cl.
CPC ....... *G02B 21/0064* (2013.01); *G01B 21/047* (2013.01); *G02B 7/1821* (2013.01); *G01B 2210/50* (2013.01)

(58) Field of Classification Search
CPC  G02B 21/0064; G02B 7/1821; G01B 21/047; G01B 2210/50
See application file for complete search history.

(56) References Cited

U.S. PATENT DOCUMENTS

| | | | |
|---|---|---|---|
| 7,369,225 B2 | 5/2008 | Messerschmidt et al. | |
| 7,477,401 B2 | 1/2009 | Marx et al. | |
| 7,626,705 B2 | 12/2009 | Altendorf | |
| 7,876,456 B2 | 1/2011 | Sesko | |
| 7,990,522 B2 | 8/2011 | Sesko | |
| 8,194,251 B2 | 6/2012 | Emtman et al. | |
| 8,212,997 B1* | 7/2012 | Xie | G01B 11/026 356/3 |
| 8,456,637 B2 | 6/2013 | Emtman et al. | |

(Continued)

OTHER PUBLICATIONS

Molesini et al., "Pseudocolor Effects of Longitudinal Chromatic Aberration," J. Optics 17(6), pp. 279-282, Paris, 1986.

*Primary Examiner* — Luke Ratcliffe
*Assistant Examiner* — Samantha K Abraham
(74) *Attorney, Agent, or Firm* — Seed IP Law Group LLP

(57) ABSTRACT

Reflective assemblies are provided that may be attached to the end of a chromatic confocal point sensor optical pen. Each reflective assembly includes a reflective surface (e.g., a turning mirror) oriented for directing a measurement beam along a measurement axis at a selected angle relative to the central Z-axis of the optical pen. Reflective assemblies with different orientations for the measurement beams (e.g., 60 degrees, 120 degrees, etc.) allow for measurements of workpiece features that cannot be achieved with a measurement beam directed in a normal incident manner or at a standard 90 degree orientation. In one implementation, the reflective assemblies may be kinematically located and retained using magnetic coupling, and may be rotated and reseated in different rotational orientations about the central Z-axis of the optical pen. A set of such reflective assemblies greatly increases the measurement capability of a single optical pen, in an economical manner.

23 Claims, 10 Drawing Sheets

(56) References Cited

U.S. PATENT DOCUMENTS

| | | | | |
|---|---|---|---|---|
| 2010/0283989 A1* | 11/2010 | Sesko | ............... | G01B 11/0608 356/4.04 |
| 2010/0284025 A1 | 11/2010 | Sesko | | |
| 2011/0286006 A1* | 11/2011 | Xie | ................... | G01B 11/0608 356/609 |
| 2012/0050723 A1* | 3/2012 | Emtman | ............... | G01B 11/14 356/123 |

* cited by examiner

INTERCHANGEABLE REFLECTIVE ASSEMBLY FOR A CHROMATIC RANGE SENSOR OPTICAL PEN

BACKGROUND

Technical Field

The invention relates generally to precision measurement instruments, and more particularly to chromatic range sensor optical pens such as may be used in a probe system for a coordinate measuring machine.

Description of the Related Art

Axial chromatic aberration techniques may be utilized for distance sensing metrology. As described in "Pseudocolor Effects of Longitudinal Chromatic Aberration", G. Molesini and S. Quercioli, J. Optics (Paris), 1986, Volume 17, No. 6, pages 279-282, controlled longitudinal chromatic aberration (also referred to herein as axial chromatic dispersion) may be introduced in an optical imaging system, causing the imaging system focal length to vary with wavelength, which provides means for optical metrology. In particular, a lens can be designed whose back focal length (BFL) is a monotonic function of wavelength. In white light operation, such a lens exhibits a rainbow of axially dispersed foci that can be used as a spectral probe for distance sensing applications.

As a further example, U.S. Pat. No. 7,477,401, which is incorporated herein by reference in its entirety, discloses that an optical element having axial chromatic aberration may be used to focus a broadband light source such that the axial distance or height of a surface determines which wavelength is best focused at that surface. Upon reflection from the surface, the light is refocused onto a small detector aperture, such as a pinhole and/or the end of an optical fiber, and only the wavelength that is well-focused on the surface is well-focused on the aperture. Other wavelengths are poorly focused and will not couple much power into the aperture. A spectrometer measures the signal level for each wavelength returned through the aperture. A wavelength intensity peak effectively indicates the distance or height of the surface.

Certain manufacturers refer to a practical and compact optical assembly that is suitable for chromatic confocal ranging in an industrial setting as a chromatic confocal point sensor, a chromatic point sensor (CPS) including an optical pen and/or as simply an "optical pen." One example of optical pen instruments that measure Z height are those manufactured by STIL, S.A. of Aix-en-Provence, France (STIL S.A.). As a specific example, the STIL optical pen model number OP 300NL measures Z heights and has a 300 micron range.

Another configuration for a chromatic confocal point sensor is described in commonly assigned U.S. Pat. No. 7,626,705, which is hereby incorporated herein by reference in its entirety. This patent discloses a lens configuration providing an improved optical throughput and an improved spot size, which results in improved measurement resolution in comparison with various commercially available configurations. Another configuration is described in commonly assigned U.S. Pat. No. 8,194,251 ("the '251 patent"), which is incorporated herein by reference in its entirety. This patent discloses a dual beam optical pen which may be positioned to measure two surface regions simultaneously.

For various applications, increasing the range of surface configurations that may be measured in comparison to currently available optical pens may be desirable. The present invention is directed to providing an improved chromatic point sensor system in which interchangeable reflective assemblies are utilized for improving the ability of a chromatic confocal point sensor pen to measure workpiece features at previously unmeasurable locations off of the unaltered measurement axis of the chromatic confocal point sensor pen (that is, the measurement axis that is provided when no reflective assembly is attached to the chromatic confocal point sensor pen).

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A reflective assembly is provided for being attached to a chromatic confocal point sensor pen. The chromatic confocal point sensor pen has a central Z-axis and provides a source beam that continues along the direction of the central Z-axis in the absence of the reflective assembly. The reflective assembly includes a mounting element and a first reflective element. The mounting element is configured to be attached to the chromatic confocal point sensor pen at a reflective assembly mounting feature. The reflective assembly is configured so that when it is operably attached to the chromatic confocal point sensor pen the first reflective element is positioned in the source beam and reflects at least a portion of the source beam as a first measurement beam along a first measurement axis that is oriented relative to the direction of the central Z-axis at a first angle that is at least 10 degrees different from perpendicular to the central Z-axis. The reflective assembly is configured to output the first measurement beam along the first measurement axis to a workpiece portion, and to return workpiece measurement light arising from the first measurement beam reflecting back from the workpiece portion to the reflective element into the chromatic confocal point sensor pen.

In various embodiments, the reflective assembly may be configured (e.g., the first angle may be designed) such that a measuring range of the chromatic confocal point sensor pen along the first measurement axis extends beyond an end of the reflective assembly as determined along the direction of the central Z-axis. In such a case, when constrained in a narrow hole, for example, the chromatic confocal point sensor pen including the reflective assembly may measure previously unmeasurable surface points on the periphery of the bottom of the hole. In some embodiments, the reflective assembly may furthermore be configured such that the measuring range of the chromatic confocal point sensor pen along the first measurement axis extends beyond a side of the optical assembly tube and a side of the first reflective assembly, as determined along a direction perpendicular to the central Z-axis. In such a case, when constrained in a narrow hole, for example, the chromatic confocal point sensor pen including the reflective assembly may measure previously unmeasurable surface points in the vicinity of an intersection between a sidewall and an end surface of a hole or cavity (e.g., down the side wall and across a corner or chamfer and onto a portion of the bottom of the hole).

In some embodiments and/or applications, the first angle may advantageously be at least 30° different from perpendicular to the central Z-axis. In some embodiments and/or applications, the first angle may advantageously be between 35 degrees and 55 degrees different from perpendicular to the central Z-axis.

The reflective assembly may be provided along with one or more additional reflective assemblies in a set. Each reflective assembly in the set may be interchangeable on the chromatic confocal point sensor (CSP) pen. (e.g., their mounting elements may be configured to be mechanically interchangeable for attachment to the chromatic confocal point sensor pen at the reflective assembly mounting feature). For a second such reflective assembly in the set, for example, when attached to the CPS pen its reflective element is thus positioned in the source beam and reflects at least a portion of the source beam as a second measurement beam along a second measurement axis that is oriented relative to the direction of the central Z-axis at a second angle that is different than a first angle associated with the measurement beam of a first reflective assembly in the set. Similarly to a first reflective assembly in the set, the second reflective assembly is configured to output the second measurement beam along the second measurement axis to a workpiece portion, and to return workpiece measurement light arising from the second measurement beam reflecting back from the workpiece portion to the reflective element into the chromatic confocal point sensor pen. In some embodiments, the second angle used in the second reflective assembly in the set may be substantially perpendicular to the central Z-axis of the CPS pen. In various embodiments, members of the set of reflective assemblies may have angles that are substantially different (e.g., first and second members may have first and second angles that differ by more than 10 degrees and less than 80 degrees relative to one another.)

In some embodiments, the mounting element of the reflective assembly may comprise a plurality of first alignment elements for seating against a mating plurality of second alignment elements included in the reflective assembly mounting feature of the chromatic confocal point sensor pen, and the first alignment elements and second alignment elements are configured to define a constrained rotational orientation of the reflective assembly relative to the chromatic confocal point sensor pen about the central Z-axis, when the first alignment elements are seating against the mating plurality of second alignment elements. In some embodiments, the first alignment elements and the second alignment elements are arranged such that the first alignment elements may be seated against a mating plurality of the second alignment elements for at least two different constrained rotational orientations of the reflective assembly relative to the chromatic confocal point sensor pen about the central Z-axis. In some embodiments, one of a mating first alignment element and second alignment element comprises a receiving portion, and the other of the mating first alignment element and second alignment element comprises an extended portion that seats against an interior surface of the receiving portion. In some embodiments, at least one of the mounting element and the reflective assembly mounting feature comprises at least one magnet configured to magnetically force the mounting element against the reflective assembly mounting feature.

It will be appreciated that the foregoing features provide a device that may be used in a method for operating a chromatic confocal point sensor pen to measure a distance to a workpiece portion that is located away from a central Z-axis of the chromatic confocal point sensor pen and along a measurement axis that is oriented relative to the direction of the central Z-axis at an angle that is at least 10 degrees different from perpendicular to the central Z-axis. In some embodiments, the method may comprise determining an (x,y,z) coordinate measurement of a workpiece portion, based at least partially on a position of the chromatic confocal point sensor pen (e.g., as determined by a coordinate measurement machine that carries the chromatic confocal point sensor pen), a measurement within the measuring range of the measuring range of the chromatic confocal point sensor pen along the first measurement axis of a first reflective assembly, and the geometric relationship of the first measuring axis to the central Z-axis of the chromatic confocal point sensor pen. In some embodiments, reflective assembly calibration data may be provided that characterizes errors in coordinate measurements obtained using the first reflective assembly, and the calibration data may be used for reducing errors that would otherwise occur in the determined (x,y,z) coordinate of the workpiece portion. The reflective assembly calibration data may be different from the calibration data that is separately provided for determining measurements along the unaltered measurement axis of the chromatic confocal point sensor pen when no reflective assembly is attached to it. In some embodiments and/or applications, the geometric relationship of the first measuring axis to the central Z-axis of the chromatic confocal point sensor pen may be determined based on a plurality of respective measurements to a reference surface in the measuring range using the first reflective assembly, at a corresponding plurality of known or measured respective positions of the chromatic confocal point sensor pen relative to the reference surface. In some such embodiments and/or applications, the chromatic confocal point sensor pen is mounted on a coordinate measuring machine and the corresponding plurality of known or measured respective positions of the chromatic confocal point sensor pen relative to the reference surface are established by respective positions and corresponding measurements provided by the coordinate measurement machine. In various embodiments and/or applications, the device may be used in a method that determines measurements usable to establish a surface profile in the previously unmeasurable vicinity of an intersection between a sidewall and an end surface of a hole or cavity.

DETAILED DESCRIPTION

Figure 1:
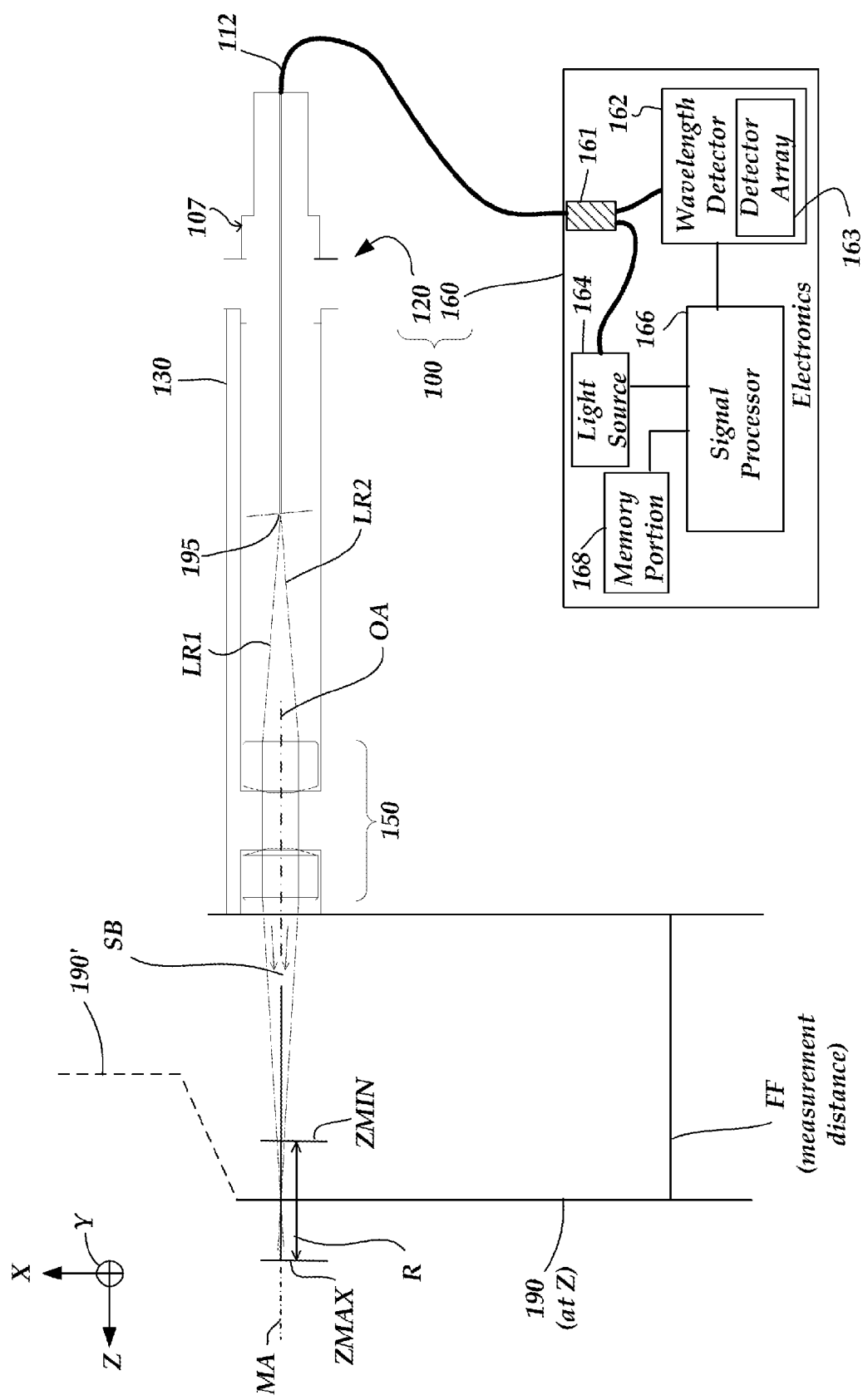
FIG. 1 is a block diagram of an exemplary chromatic confocal point sensor including an optical pen that produces a measurement beam.

FIG. 1 is a block diagram of an exemplary chromatic confocal point sensor 100. The chromatic confocal point sensor 100 has certain similarities to sensors described in U.S. Pat. Nos. 7,876,456; 7,990,522; 8,194,251 and 8,456,637 which are hereby incorporated herein by reference in their entirety. As shown in FIG. 1, the chromatic confocal point sensor 100 includes an optical pen 120 and an electronics portion 160. The optical pen 120 includes a fiber optic connector 107, a housing 130, and an optics portion 150. The fiber optic connector 107 is attached to the end of the housing 130. The fiber optic connector 107 receives an in/out optical fiber (not shown in detail) through a fiber optic cable 112 which encases it. The in/out optical fiber outputs source light through a fiber aperture 195, and receives a reflected measurement signal light through the fiber aperture 195.

In operation, broadband (e.g., white) source light emitted from the fiber end through the fiber aperture 195 is focused by the optics portion 150, which provides an axial chromatic dispersion, such that the focal point along the optical axis OA is at different distances depending on the wavelength of the light. The source light includes a wavelength that is focused on a workpiece surface 190 at a position Z relative to the optical pen 120. Upon reflection from the workpiece surface 190, reflected light is refocused by the optics portion 150 onto the fiber aperture 195. The operative source light and reflected light are bounded by the limiting rays LR1 and LR2. Due to the axial chromatic dispersion, only one wavelength will have a front focus dimension FF that matches the measurement distance from the optical pen 120 to the surface 190. The optical pen is configured such that the wavelength that is best focused at the surface 190 will also be the wavelength of the reflected light that is best focused at the fiber aperture 195. The fiber aperture 195 spatially filters the reflected light such that predominantly the best focused wavelength passes through the fiber aperture 195 and into the core of the optical fiber cable 112. As described in more detail below and in the incorporated references, the optical fiber cable 112 routes the reflected signal light to a wavelength detector 162 that is utilized for determining the wavelength having the dominant intensity, which corresponds to the measurement distance to the workpiece surface 190.

The electronics portion 160 includes a fiber coupler 161, the wavelength detector 162, a light source 164, a signal processor 166 and a memory portion 168. In various embodiments, the wavelength detector 162 includes a spectrometer or spectrograph arrangement that receives the reflected light through the optical fiber cable 112 and transmits the resulting spectral intensity profile to a detector array 163. The wavelength detector 162 may also include related signal processing (e.g., provided by the signal processor 166, in some embodiments) that removes or compensates certain detector-related error components from the profile data. Thus, certain aspects of the wavelength detector 162 and the signal processor 166 may be merged and/or indistinguishable in some embodiments.

The white light source 164, which is controlled by the signal processor 166, is coupled through the optical coupler 161 (e.g., a 2×1 optical coupler) to the fiber cable 112. As described above, the light travels through the optical pen 120 which produces longitudinal chromatic aberration so that its focal length changes with the wavelength of the light. The wavelength of light that is most efficiently transmitted back through the fiber is the wavelength that is in focus on the surface 190 at position Z. The reflected wavelength-dependent light intensity then passes through the fiber coupler 161 again so that approximately 50% of the light is directed to the wavelength detector 162, which may receive a spectral intensity profile distributed over an array of pixels along a measurement axis of the detector array 163, and operate to provide corresponding profile data as described in more detail below with respect to FIG. 3 and in the incorporated references. Briefly, a subpixel-resolution distance indicating coordinate of the profile data (e.g., a peak position coordinate) is calculated by the signal processor 166, and the distance indicating coordinate corresponding to the wavelength peak determines the measurement distance to the surface via a distance calibration lookup table which is stored in the memory portion 168. The distance indicating coordinate may be determined by various methods such as determining the centroid of profile data included in a peak region of the profile data.

As will be described in more detail below, in accordance with various embodiments described herein, it may be desirable in some instances for the chromatic confocal point sensor 100 to be able to measure a distance to a workpiece feature that is not located along the unaltered Z-axis of the optical pen 120. For example, it may be desirable in some implementations to be able to measure workpiece features such as screw threads located at the bottom of a hole into which the optical pen 120 has been inserted, undercut features, O-ring grooves, ACME square threads, etc. As will be described in more detail below with respect to FIG. 2, in accordance with various embodiments described herein, reflective assemblies may be provided which can be attached to the end of an optical pen 120, and which allow measurements of workpiece features to be taken at various angular orientations, including measurements of workpiece features located beyond the end, and to the side, of an optical pen.

Figure 2:
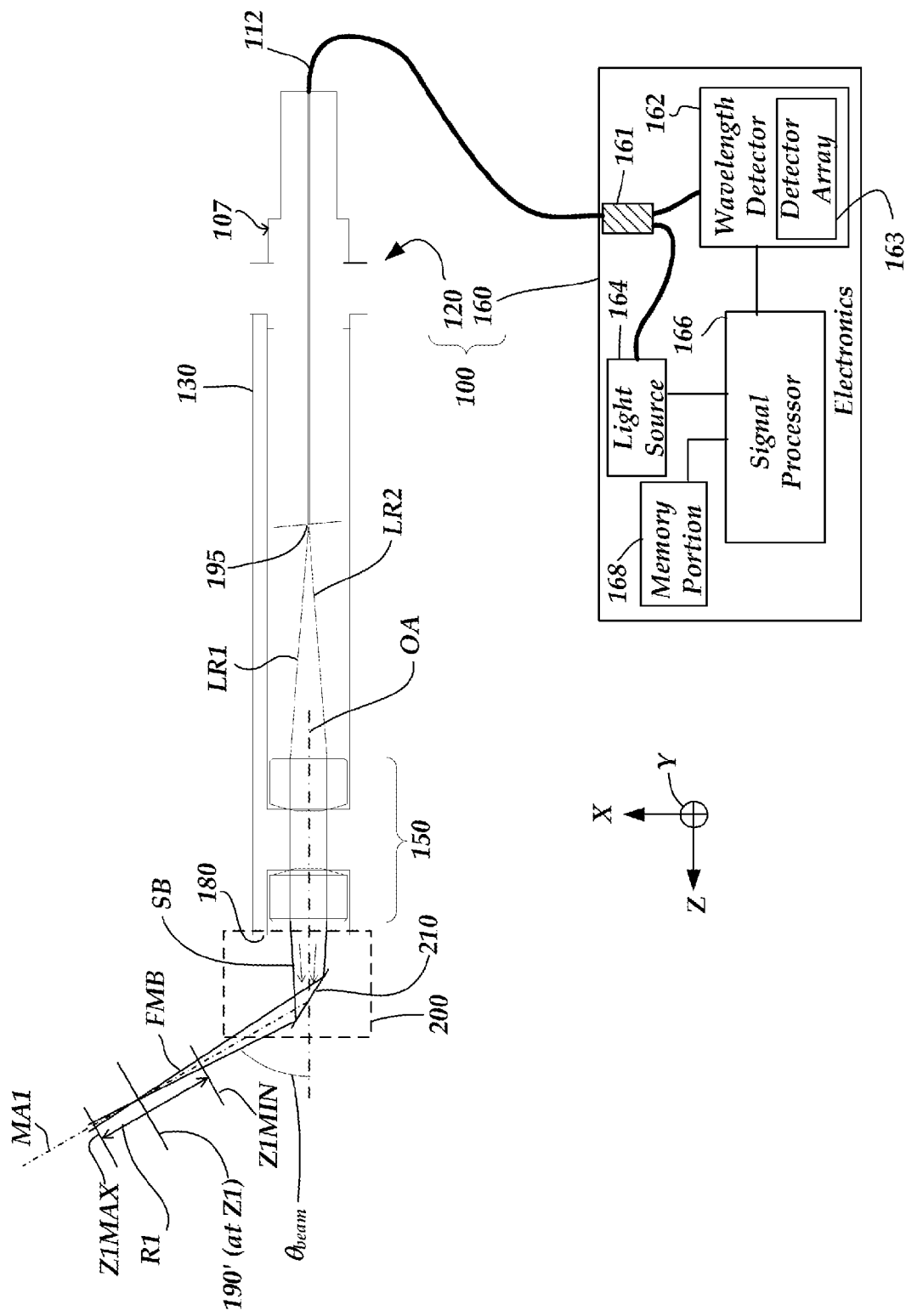
FIG. 2 is a block diagram of the chromatic confocal point sensor of FIG. 1 as further enhanced by a schematically represented reflective assembly that is attached to the end of the optical pen in accordance with principles disclosed herein.

FIG. 2 is a block diagram of the chromatic confocal point sensor 100 including the optical pen 120 of FIG. 1 with a schematically represented reflective assembly 200 attached. As will be described in more detail below, the reflective assembly 200 in one configuration outputs a first measurement beam FMB along a first measurement axis MA1 that is oriented at an angle θbeam relative to the central Z-axis OA of the optical pen 120. As shown in FIG. 2, the reflective assembly 200 includes a first reflective element 210 which is located in the path of the source beam SB of the optical pen 120. The first reflective element 210 reflects at least a portion of the source beam SB as the first measurement beam FMB.

With regard to the operation of the optical pen 120 with the reflective assembly 200 attached, for measurements achieved with the first measurement beam FMB, a measurement range R1 is shown to have a minimum range distance Z1MIN and a maximum range distance Z1MAX. In one embodiment, the range R1 and the distances Z1MIN and Z1MAX may correspond approximately to the range R and the distances ZMIN and ZMAX as illustrated in FIG. 1, except in the angular orientation according to the angle θbeam. As illustrated in FIG. 2, the surface 190' at the position Z1 falls in a central portion of the measurement range R1. It should be appreciated that the surface 190' need not be perpendicular to the first measurement axis MA1 at the position Z1. More generally, the configuration shown in FIG. 2 is capable of measuring the distance to surfaces that are not perpendicular along the first measurement axis MA1. A coordinate system and related techniques for determining overall surface location coordinate measurements based on the geometric relationship of measurement range R1 of the first measurement beam FMB to the optical pen 120 will be described in more detail below with respect to FIG. 10.

Figure 3:
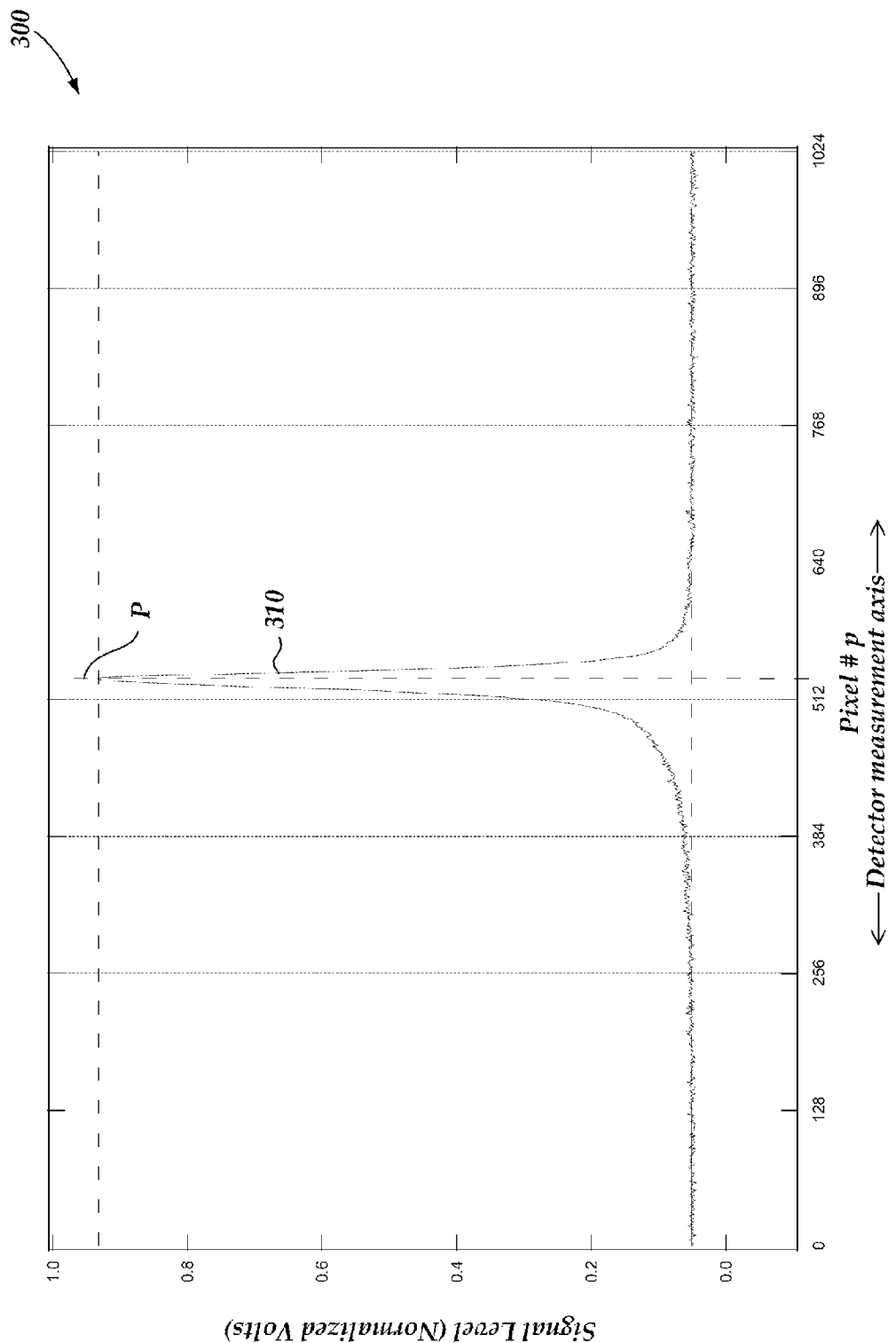
FIG. 3 is a diagram of a spectral intensity profile obtainable by a chromatic confocal point sensor, including a spectral peak component that may correspond to a distance from the optical pen to a surface.

FIG. 3 is a diagram 300 of spectral intensity profile data 310 obtainable by a chromatic confocal point sensor, including a spectral peak component that may correspond to a unique distance from an optical pen to a measured surface portion, either with or without a reflective assembly (e.g., the reflective assembly 200) attached along a measurement axis. Spectral data such as that shown in FIG. 3 is generally understood in the art, for example, as described in the incorporated references. The profile data 310 shows a signal level associated with each pixel p (in normalized volts).

The profile data 310 exhibits a spectral peak having a peak position coordinate (i.e., P). The peak position coordinate P may be determined with sub pixel resolution based on determining the peak of a curve fit to the peak region of the profile data 310, or based on the centroid of peak regions of the profile data 310, or various other calibration and signal processing methods (e.g., as described in more detail in the incorporated references). As previously discussed with respect to FIG. 1, a measurement distance "Z" may be determined as the measurement distance that corresponds to the value of the peak position coordinate in the stored distance calibration data. In various embodiments, the stored distance calibration data may be interpolated to give a measurement distance precisely corresponding to the sub pixel peak position coordinate. It will be understood that when no reflective assembly is attached to an optical pen, the spectral peak shown in FIG. 3 corresponds to a position within the measuring range R along the measuring axis MA, as illustrated in FIG. 1. When a reflective assembly is attached to an optical pen, the spectral peak shown in FIG. 3 corresponds to a position within the measuring range R1 along the measuring axis MA1, as illustrated in FIG. 2. As previously indicated, the geometric relationship of a position within the measurement range R of a measurement beam MB to the optical pen 120 will be described in more detail below with respect to FIG. 10.

FIGS. 4A-4D are diagrams of cutaway side views of different embodiments of an optical pen 120 and reflective assemblies 200 in use. As shown in FIG. 4A, a reflective assembly 200A is mounted to the end of the optical pen 120. The optical pen 120 includes an optics portion 150 and a reflective assembly mounting feature 170. In the particular embodiment shown in FIG. 4A, the reflective assembly mounting feature 170 includes a ring-like magnetic element 175 and a seating configuration 180 which may include various alignment elements 185, as will be described in more detail below and further with respect to FIG. 6A. The particular embodiment of the reflective assembly 200A includes a reflective element 210A, a mounting element 270 and an assembly end surface 288. The mounting element 270 includes a seating configuration 180 which may include various alignment elements 285, which seat against a mating plurality of the alignment elements 185, as will be described in more detail below with respect to FIG. 6A. The reflective element 210A reflects at least a portion of a source beam SB from the optical pen 120 (shown in dotted outline) as a measurement beam MB-A. In the embodiment of FIG. 4A, the reflective element 210A is oriented at an angle such that a measurement axis MA-A of the measurement beam MB-A is oriented at approximately perpendicular to the central Z-axis OA of the optical pen 120. In the embodiments of FIGS. 4A-4D, the central Z-axis OA may correspond with the unaltered optical axis and/or measuring axis of the optical pen 120.

As will be described in more detail below with respect to FIGS. 4B and 4C, different reflective assemblies may be configured to direct the measurement beam at different angles relative to the central Z-axis OA of the optical pen 120. A coordinate system for referencing the different angles and mounting orientations will be described in more detail below with respect to FIG. 10.

One problem with respect to the 90 degree configuration of FIG. 4A (that is, where the measuring axis MA-A is substantially perpendicular to the central Z-axis of the optical pen) is that the measurement axis MA-A is located at a distance D1 above an assembly end plane AEP that is defined by the assembly end surface 288. Thus, a feature that is being measured must be located at approximately the distance D1 above the corresponding assembly end plane AEP. Such a configuration makes it difficult or impossible to measure features that are located away from the measuring axis MA-A (e.g., along the range of the dimension D1), or beyond the assembly end plane AEP, such as a feature located at or near the bottom of a hole into which the optical pen 120 is inserted. As disclosed below with respect to FIGS. 4B and 4C, reflective assemblies may be provided that provide measurement beams along measurement axes that allow for the measurement of workpiece features that are unmeasurable using the configuration of FIG. 4A. More specifically, a configuration for measuring an "undercut feature" will be described in more detail below with respect to FIG. 4B (and further below with respect to FIG. 8), while a configuration for measuring a feature located at the very bottom of a hole, such as a lowest screw thread or bottom corner or chamfer, will be described in more detail below with respect to FIG. 4C.

As shown in FIG. 4B, a reflective assembly 200B is mounted to the end of the optical pen 120. The reflective assembly 200B includes a reflective element 210B that is oriented so as reflect at least a portion of the source beam SB from the optical pen 120 as a measurement beam MB-B. In the embodiment of FIG. 4B, a measurement axis MA-B of the measurement beam MB-B is oriented at approximately a 120 degree angle from the central Z-axis OA of the optical pen 120. As will be described in more detail below with respect to FIG. 8, this configuration allows for the measurement of previously unmeasurable undercut workpiece features, for example.

As shown in FIG. 4C, a reflective assembly 200C is mounted to the end of the optical pen 120. The reflective assembly 200C includes a reflective element 210C which is oriented so as to reflect at least a portion of the source beam SB from the optical pen 120 as a measurement beam MB-C. In the embodiment of FIG. 4C, a measurement axis MA-C of the measurement beam MB-C is oriented at approximately a 60 degree angle relative to the central Z-axis OA of the optical pen 120. The orientation of the measurement beam MB-C allows for the measurement of workpiece features that are located in the vicinity of the assembly end plane AEP), for example. As a specific illustrative example, the optical pen 120 may be inserted into a hole where the workpiece feature to be measured is near the bottom of the hole (e.g., w a lowest screw thread that extends down to the bottom of the hole, or a chamfer, or bottom corner, or the like).

As shown in FIG. 4D, a reflective assembly 200 is not mounted to the optical pen 120. In this case, similar to known devices, the source beam SB continues along the direction of the central Z-axis OA of the optical pen 120 as a measurement beam MB-D. The measurement axis MA-D, and correspondingly the measurement beam MB-D, is thus at a zero degree angle relative to the central Z-axis OA of the optical pen 120. As will be described in more detail below with respect to FIGS. 5-7, in one specific example implementation, the reflective assemblies 200A-200C may be kinematically located and retained against the optical pen 120 shown in FIG. 4D using magnetic coupling, and may also be rotated about the central Z-axis and reseated in a different mounting orientations.

It will be appreciated that although each of the reflective assemblies 200A-200C shown in FIGS. 4A-4C appear identical, except for their reflective elements, this example of a set of reflective assemblies is exemplary only and not limiting. More generally, provided that the various reflective assemblies in a set are configured to be mechanically interchangeable for attachment to a chromatic confocal point sensor pen 120 at the reflective assembly mounting feature 170, that they need not be identical.

Figure 4:
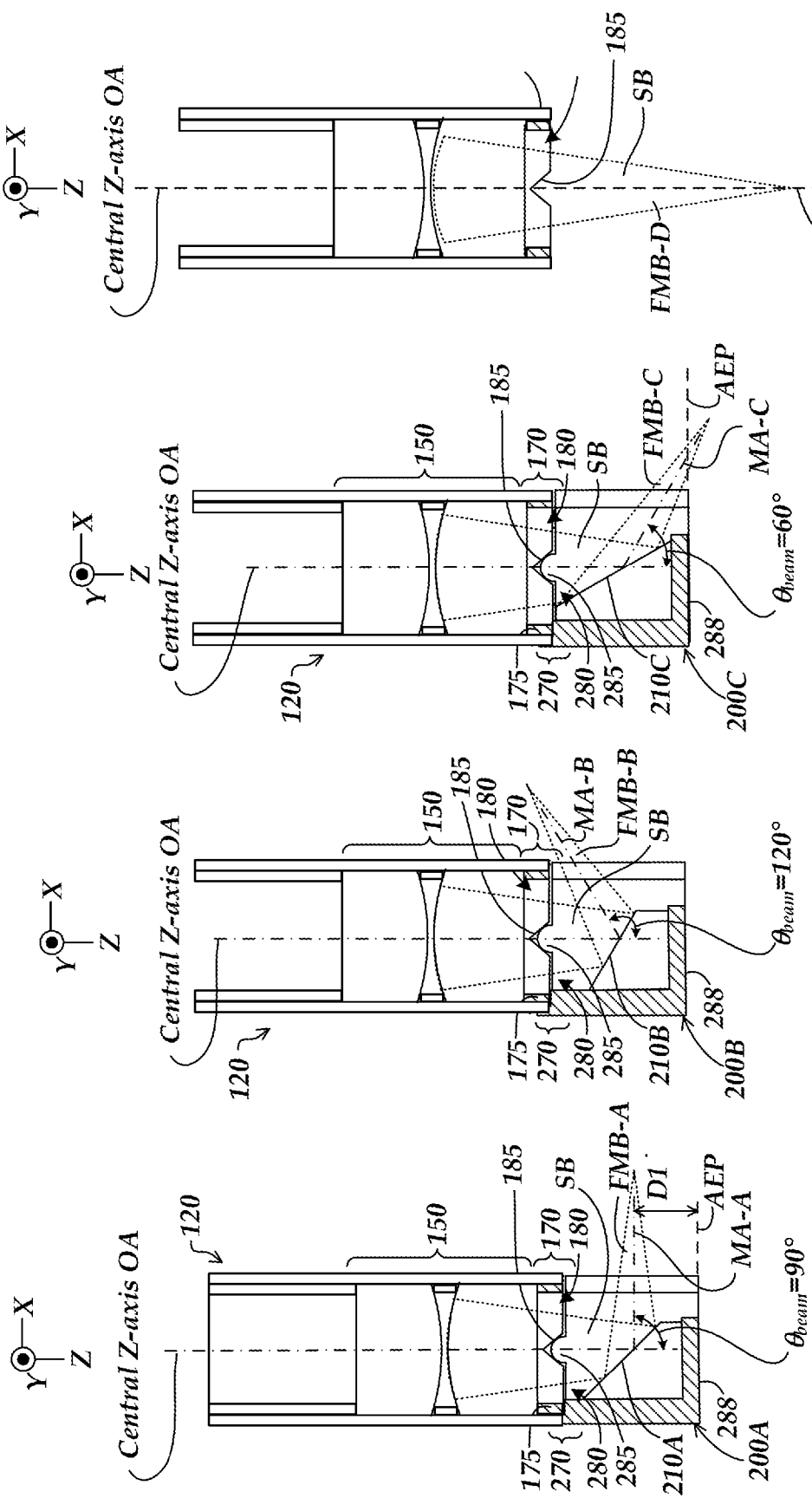
FIGS. 4A-4D are diagrams of cutaway side views of different embodiments of reflective assemblies and an optical pen in use.
Figure 5:
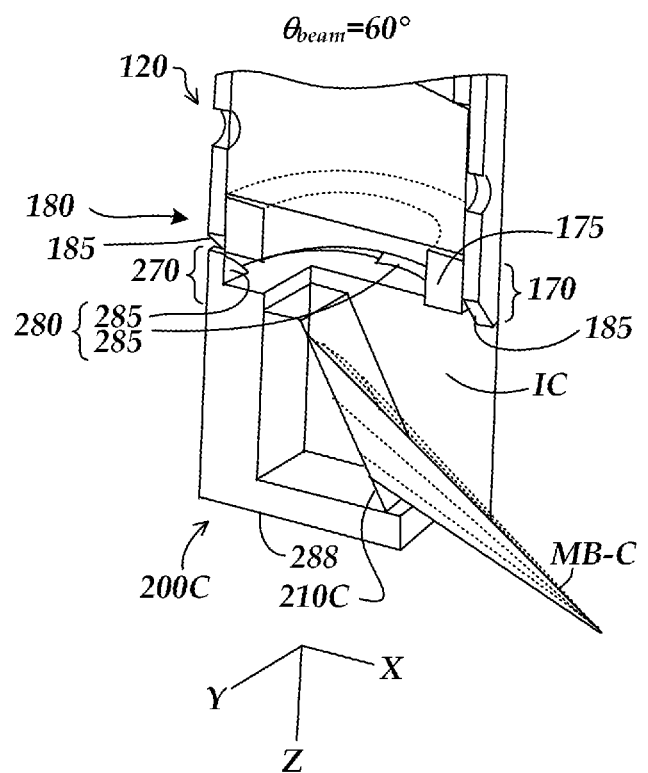
FIG. 5 is a diagram of an isometric cutaway side view of the embodiment of FIG. 4C as attached to an optical pen in use.

FIG. 5 is a diagram of an isometric cutaway side view of the reflective assembly 200C of the embodiment of FIG. 4C as attached to an optical pen 120 in use. As shown in FIG. 5, the measurement beam MB-C is reflected through an interior chamber IC from the reflective element 210C along the measurement axis MA-C at the approximately 60 degree angle relative to the central Z-axis OA of the optical pen 120. The magnetic element 175 is shown to be a ring magnet, located above the seating configuration 180 which is also part of the reflective assembly mounting feature 170. In the illustrated mounted orientation, the mounting element 270 of the reflective assembly 200C is shown proximate to the reflective assembly mounting feature 170, and its seating configuration 280 includes alignment elements 285 comprising extended portions for seating against mating receiving alignment elements 185 of the seating configuration 180 reflective assembly mounting feature 170, as will be described in more detail below with respect to FIGS. 6A and 6B.

Figure 6A:
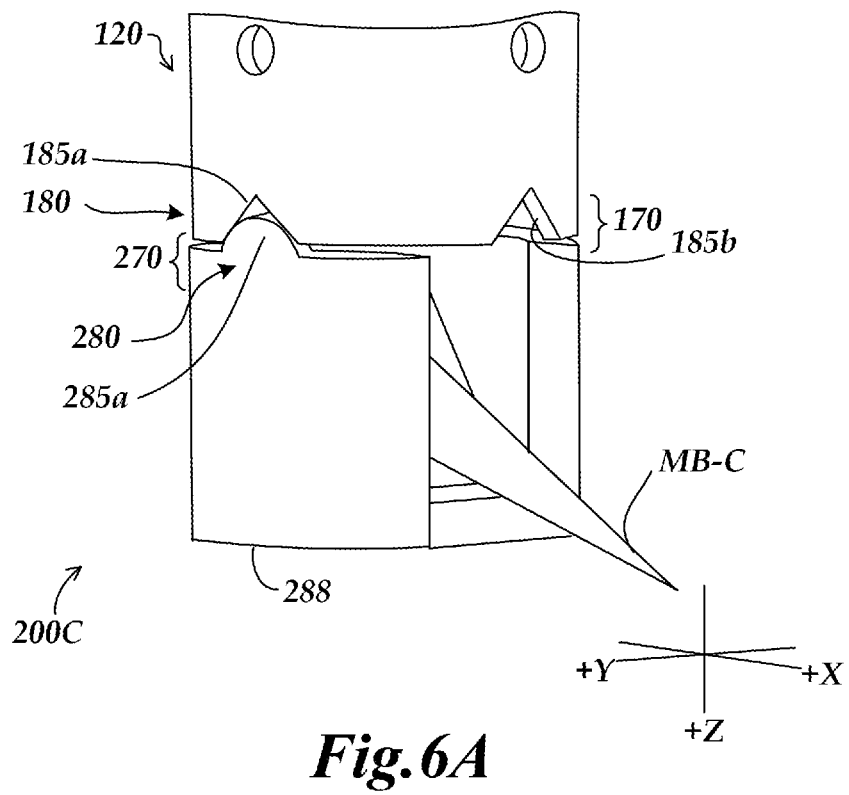
FIGS. 6A and 6B are diagrams of isometric and top views, respectively, of the embodiment of FIG. 5 as further illustrating how the reflective assembly may be mounted and rotated relative to the optical pen.
Figure 6B:
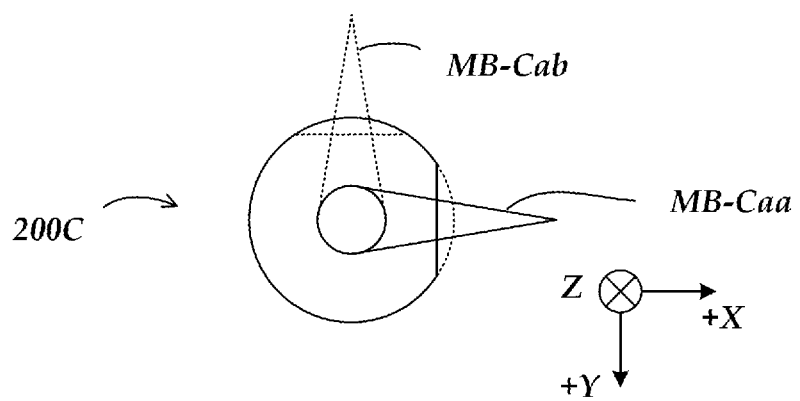

FIGS. 6A and 6B are diagrams of isometric and top views, respectively, of the embodiment of FIG. 5 as further illustrating how the reflective assembly may be mounted and rotated relative to the optical pen 120. As shown in FIG. 6A, the mounting element 270 of the reflective assembly 200C is shown proximate to the reflective assembly mounting feature 170. The seating configuration 280 of the mounting element 270 includes alignment elements 285 comprising extended portions. The extended alignment elements 285 for seating against the mating interior surfaces of the receiving alignment elements 185 of the seating configuration 180 of the reflective assembly mounting feature 170. In the embodiment of FIG. 6A, the receiving alignment elements 185 are configured as "V" groove notches with the notch axis aligned along the radial direction, and the extended portions of the alignment elements 285 are configured as short half-cylinders with the cylinder axis aligned along the radial direction. It will be understood that this arrangement of extended and receiving alignment elements is exemplary only and not limiting. More generally, as long as mating pairs of alignment elements seat against one another so as to repeatably locate the reflective assembly 200 relative to the optical pen 120, some or all of the extended and receiving alignment elements may be reversed on the mating members, and so on.

Generally speaking, in various embodiments, the alignment elements are configured such that a first plurality of alignment elements (e.g., three or more elements) located on a reflective assembly 200 may be seated against a mating plurality of alignment elements located on an optical pen 120, such so as to constraint the reflective assembly 200 in a stable and repeatable relationship relative to the optical pen 120. In some embodiments, such as that shown in FIG. 6A, the alignment elements are configured such that they mate for each of at least two different constrained rotational orientations of the reflective assembly relative to the chromatic confocal point sensor pen about the central Z-axis. In this example, the receiving alignment elements 185 and the extended alignment elements 285 are all located at the same radius, and located at 90° increments around a circle. Thus, seating may occur at each 90° rotational step of the orientation of the reflective assembly relative to the optical pen 120. Alternative embodiments include locating all the alignment elements of 120° increments, and so on. In addition, in various embodiments, receiving alignment elements can be spaced more densely than extended alignment elements, in order to provide an increased number of kinematic alignment positions, if desired. For example, receiving alignment elements could be spaced at 60° increments while the extended alignment elements could be located at 120° increments in order to provide three mating pairs of alignment elements for each 60° increment of rotation of the reflective assembly relative to the optical pen.

To clarify, FIG. 6B provides a schematic top view of two possible rotational orientations for mounting the reflective assembly 200C relative to the optical pen 120. First and second mounting orientations are illustrated. A first measurement beam MB-Caa is illustrated aligned along the X-axis direction, corresponding to the rotational relationship shown in FIG. 6A, where the individual alignment element 285a mates with the individual alignment element 185a, as shown in FIG. 6A. A second measurement beam MB-Cab is illustrated in dashed outline, aligned along the Y-axis direction, corresponding to a rotational relationship where the individual alignment element 285a shown in FIG. 6A mates with the individual alignment element 185b shown in FIG. 6A. In one implementation, a mounting orientation sensor (not shown) may be provided for sensing the mounting orientation of the reflective assembly 200C relative to the end of the optical pen 120. It will be appreciated that it may be desirable to perform various calibration operations relative to each potential mounting orientation of the reflective assembly. A coordinate system that may be utilized to describe the calibration operations for different mounting and angular orientations is outlined below with respect to FIG. 10.

In an alternative implementation, the features of the reflective assembly mounting feature 170 and the mounting element 270 may be configured so that only a single mounting orientation may be achieved for the reflective assembly 200C relative to the optical pen 120. In such an implementation, physical rotation of the optical pen 120, or other techniques, may be utilized for measuring workpiece features located at different rotated orientations relative to the central Z-axis of the optical pen 120. In yet another alternative implementation, the reflective assembly 200 may be automatically rotatable (e.g., using a motor, etc.) rather than being locked in relative to the end of the optical pen 120.

Figure 7:
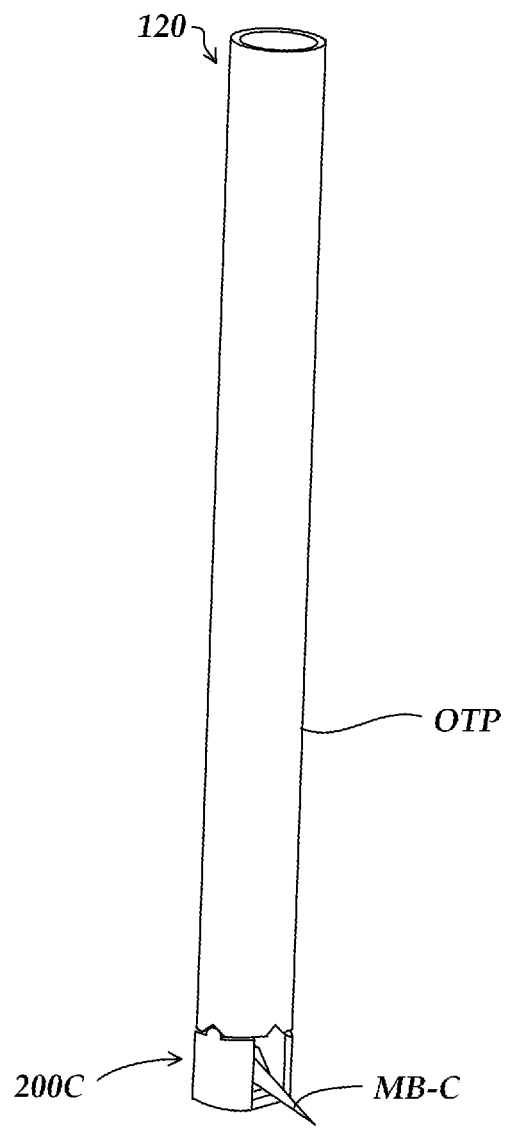
FIG. 7 is a diagram of an isometric side view of the embodiment of FIG. 5 as further illustrating the reflective assembly relative to an elongated optical assembly tube portion of the optical pen.

FIG. 7 is a diagram of an isometric side view of the embodiment of FIG. 5 as further illustrating the reflective assembly 200C relative to an elongated optical assembly tube portion OTP (e.g., similar to the housing 130 previously described with reference to FIG. 1) of an optical pen 120. It will be appreciated that as described above with respect to FIGS. 5, 6A and 6B, the reflective assembly 200C may be easily attached and removed from the optical pen 120. As noted above with respect to FIG. 4D, when the reflective assembly is detached, the optical pen 120 may be utilized in an unaltered state, typical of known prior art devices. When the reflective assembly 200C is attached, workpiece features may be measured along the associated measuring axis orientation (e.g., at the bottom of a hole near an assembly end plane AEP). As noted above, other reflective assemblies 200 may also be interchangeably attached to the optical pen 120 to achieve other measuring axis orientations. For example, as will be described in more detail below with respect to FIG. 8, a reflective assembly (e.g., reflective assembly 200B of FIG. 4B) may be attached to an optical pen 120 for the measurement of other types of workpiece features (e.g., undercut features).

Figure 8:
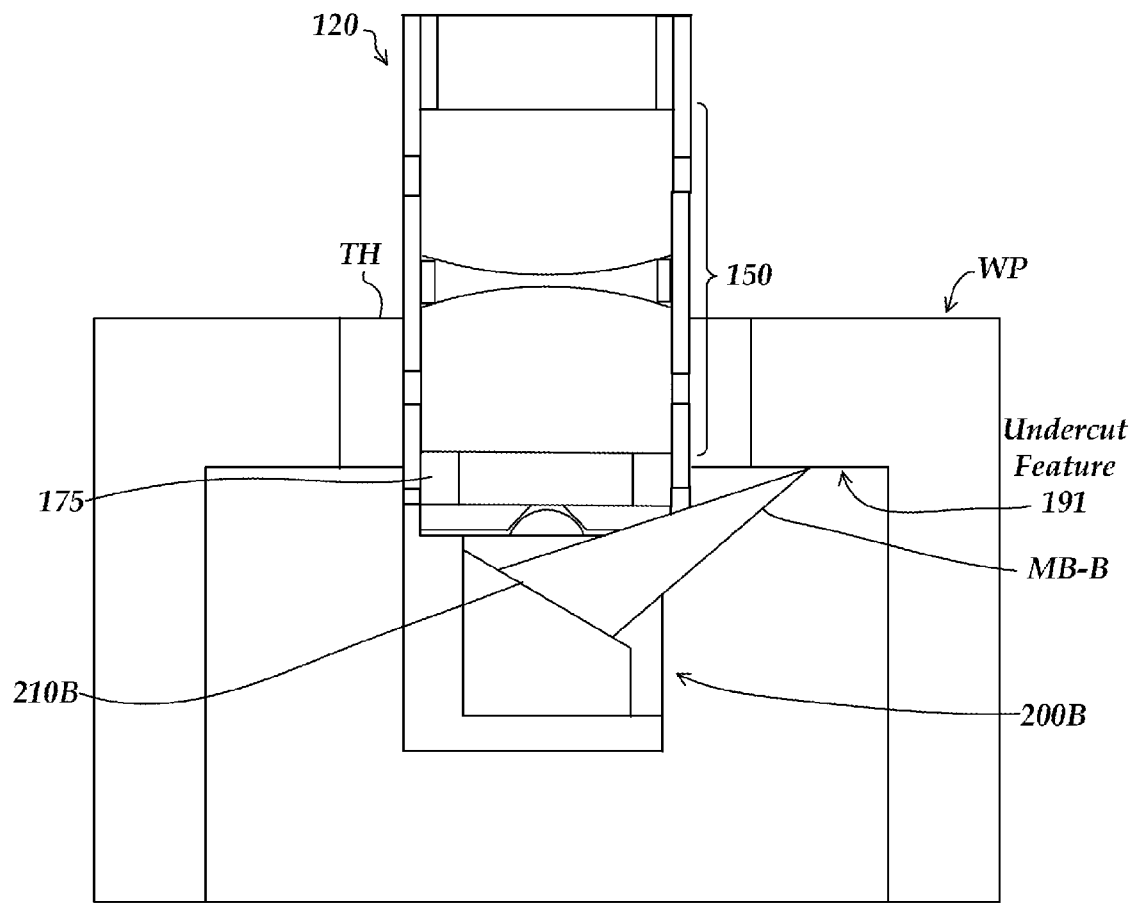
FIG. 8 is a diagram of a cross-sectional side view of the embodiment of FIG. 4B as measuring an undercut feature of a workpiece.

FIG. 8 is a diagram of a cross-sectional side view of the reflective assembly 200B of FIG. 4B as measuring an undercut feature 191 of a workpiece. As illustrated, the workpiece may include a cylindrical chamber with a partial undercut feature 191 to be measured. As shown in FIG. 8, the end of the optical pen 120 including the reflective assembly 200B is inserted through a top hole TH in the workpiece WP, so that the reflective assembly 200B is located below the undercut ceiling feature 191. As described above with respect to FIG. 4B, the measurement axis MA-B, and correspondingly the measurement beam MB-B, is oriented upward at approximately a 120 degree angle relative to the central Z-axis OA of the optical pen 120. In this manner, a measurement is able to be taken of the undercut feature 191 which is located above the reflective assembly 200B.

As described above with respect to FIGS. 2-8, interchangeable reflective assemblies (e.g., reflective assemblies 200B and 200C) allow for the measurements of various types of workpiece features (e.g., ACME square threads, general screw threads that extend to the bottom of a hole, the lower and upper inner surfaces of O-ring grooves, general undercut features, etc.) Such workpiece features would not be able to be measured with the optical pen 120 in a normal incident manner, or even with a standard 90 degree measurement beam orientation (e.g., as illustrated in FIG. 4A). The interchangeability of the reflective assemblies thus allows for greater flexibility in the measurement functions of an optical pen 120 and a corresponding probe. As will be described in more detail below with respect to FIG. 9, such probes may be utilized by various types of systems, such as a coordinate measuring machine system.

Figure 9:
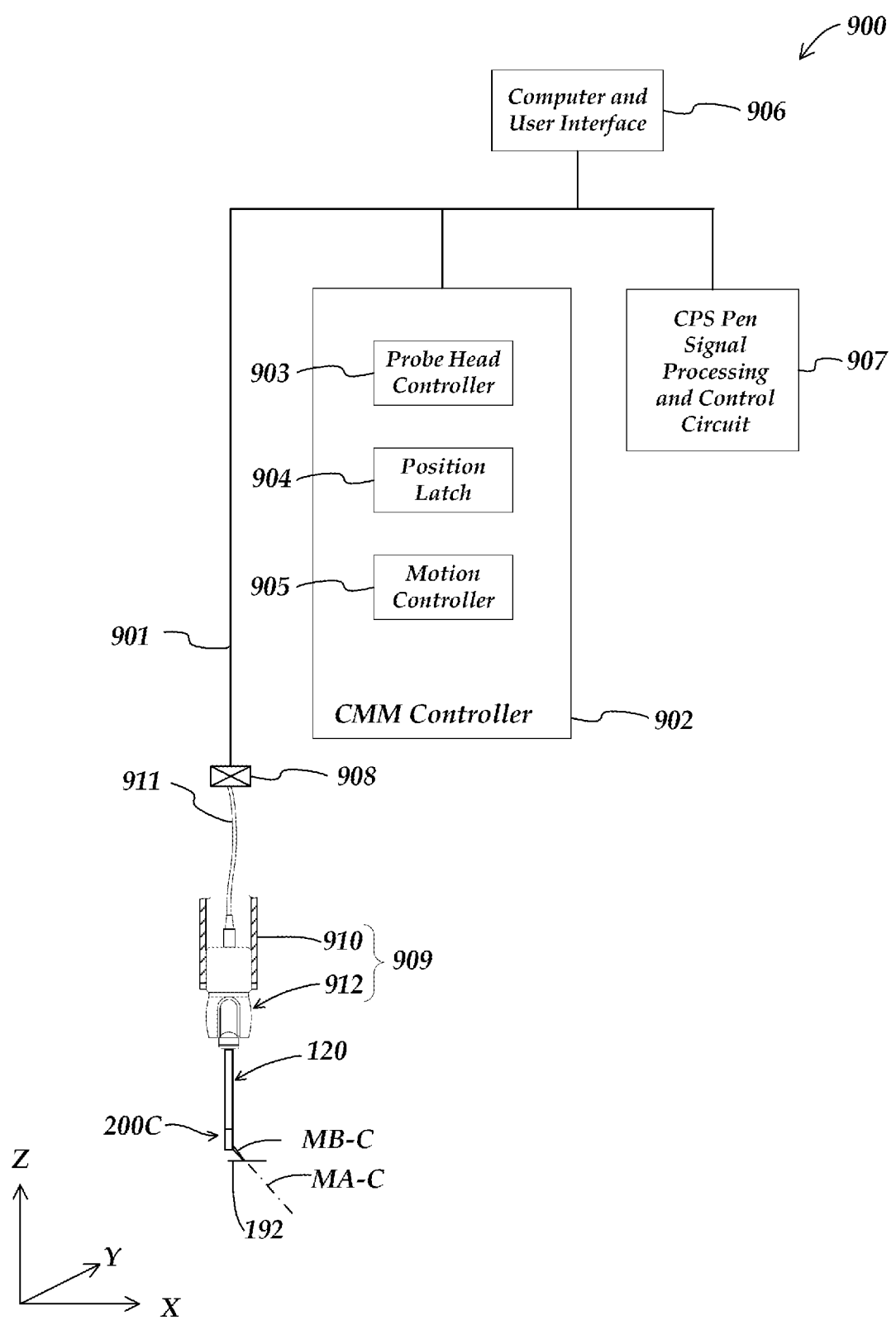
FIG. 9 is a block diagram of a chromatic confocal point sensor system including an optical pen with a reflective assembly and an electronics portion, which may be coupled to an external device in the form of a coordinate measuring machine (CMM) including a CMM controller and a user interface.

FIG. 9 is a block diagram of a measurement system 900 including a chromatic confocal point sensor system having an optical pen 120 with a reflective assembly 200 and an electronics portion, which may be coupled to an external device in the form of a coordinate measuring machine (CMM) including a CMM controller and a user interface. In applications to inspect various geometric characteristics of workpiece features, the optical pen 120 may be coupled to any CMM known in the art, which is capable of controlling the precise position of the optical pen 120 along each of X, Y and Z axes. Typically, a CMM has a bridge movable along one axis of the XY plane, and a carriage movable along the bridge along the other axis of the XY plane. The Z-axis movement is provided by a vertical quill that moves up and down through the carriage.

As shown in FIG. 9, a distal end of the vertical quill 910 of a CMM 909 includes a probe head 912 configured to receive a variety of interchangeable elongated probes, such as the optical pen 120 according to various embodiments. In one embodiment, the probe head 912 of the CMM may incorporate the standard Renishaw™ autojoint connection configuration most commonly used for certain applications in the industry, available from Renishaw Metrology Ltd. in Gloucestershire, UK. In the example of FIG. 9, the optical pen 120 is coupled to the probe head 912 to inspect a geometric characteristic of a workpiece feature 192 (e.g., a screw thread at the bottom of a hole into which the optical pen 120 is inserted). The CMM communicates with other components through a data transfer line 901 (e.g., a bus), which is connected by a connector 908 (e.g., a "micro-D" type connector) to a probe head cable 911 that provides signals to and receives signals from the optical pen 120. The CMM 909, to which the optical pen 120 is coupled, is controlled by a CMM controller 902, while the optical pen 120 exchanges data with, and is controlled by, a CPS pen signal processing and control circuit 907 (e.g., in one embodiment provided by the signal processor 166 and the memory portion 168 in the electronics portion 160 of FIG. 2). The user may control all of the components through a computer and user interface 906.

The CMM controller 902 includes a probe head controller 903 configured to control operation of the probe head 912, and a motion controller 905 specifically configured to control the precise position and movement of the probe head 912 and hence of the optical pen 120 in X-, Y- and Z-directions, as known in the art. The CMM controller 902 also includes a position latch 904 that produces an XYZ position of the probe head 912. A corresponding position latch included in the CPS pen signal processing and control circuit 907 produces an XYZ latch signal of the optical pen 120, and communicates with the position latch 904 in the CMM controller 902 to synchronize the coordinates of the CMM 909 with the measurement coordinates of the optical pen 120. Thus, geometric characteristics of a workpiece feature, such as a feature (e.g., a screw thread near the bottom of a hole) which is inspected by the optical pen 120 coupled to the CMM, may be determined based on CMM coordinates that correspond to the position of the optical pen 120, in combination with the optical pen measurement(s). The coordinate system and/or surface coordinates provided by the measurements may depend at least in part on the geometric relationship (e.g., offset and angle) of the measuring axis MA-C relative to the optical pen 120, as well as the optical pen base coordinates as determined by the CMM.

According to various embodiments, methods are provided that allow a user to inspect or measure a geometric characteristic of a workpiece feature with a CPS pen. In various applications, the methods involve positioning the optical pen 120 to determine measurement points of the workpiece feature. In further applications, the methods involve moving the optical pen 120 along one or more of the X, Y and Z axes, to thereby determine additional measurement points of the workpiece feature. Such movements of the optical pen 120 can be readily accomplished by any standard CMM, to which the optical pen 120 may be coupled. As described above, interchangeable reflective assemblies 200 may be attached to the end of the optical pen 120 to allow measurements in angular orientations that cannot otherwise be achieved with the movements of the CMM (e.g., when movements of the CMM are restricted due to the optical pen 120 being inserted in a hole for the measurements). The instructions to inspect a workpiece, including various features to be inspected, are typically embodied in a workpiece program or a part program that can be executed by the CMM.

It will be understood that the optical pen 120 may be used with or without a reflective assembly in a wide variety of other measurement systems that are equipped to hold the optical pen 120 to measure a workpiece. As one additional example, the optical pen 120 may be used in connection with a machine vision inspection system known in the art, such as QUICK VISION® QV Apex series of microscopic-type vision systems available from Mitutoyo America Corporation in Aurora, Ill. Briefly, a machine vision inspection system includes a movable vision (camera) system and a movable stage, on which a workpiece to be visually inspected is placed. The vision system and/or the stage are movable along X, Y and Z axes such that the vision system can acquire a complete image of the workpiece placed on the stage for inspection and analysis purposes. The instructions to acquire an image of a workpiece including various features to be inspected, and to inspect the acquired image, are typically embodied in a workpiece program or a part program that can be executed on the machine vision inspection system.

Some of the vision systems may include a probe sub-system configured to hold a specialized probe, such as the optical pen 120 according to various embodiments. Thus, by coupling the optical pen 120 to the probe sub-system of the vision system, a user can utilize the controller of the machine vision inspection system to control the position and movement of the optical pen 120 along X-, Y- and Z-directions, to thereby obtain measurement points of a workpiece feature, similar to using a CMM to control the position and movement of the optical pen 120. In this configuration, standard CMM techniques may be utilized in conjunction with standard machine vision techniques to control the probe sub-system to automatically position and move the optical pen 120 and reflective assembly 200 in relation to the workpiece feature to be measured according to various embodiments. As noted above, the coordinate system and/or surface coordinates provided by the measurements may depend at least in part on the geometric relationship (e.g., offset and angle) of the measuring axis MA-C relative to the optical pen 120, as well as the optical pen base coordinates as determined by the CMM.

Figure 10:
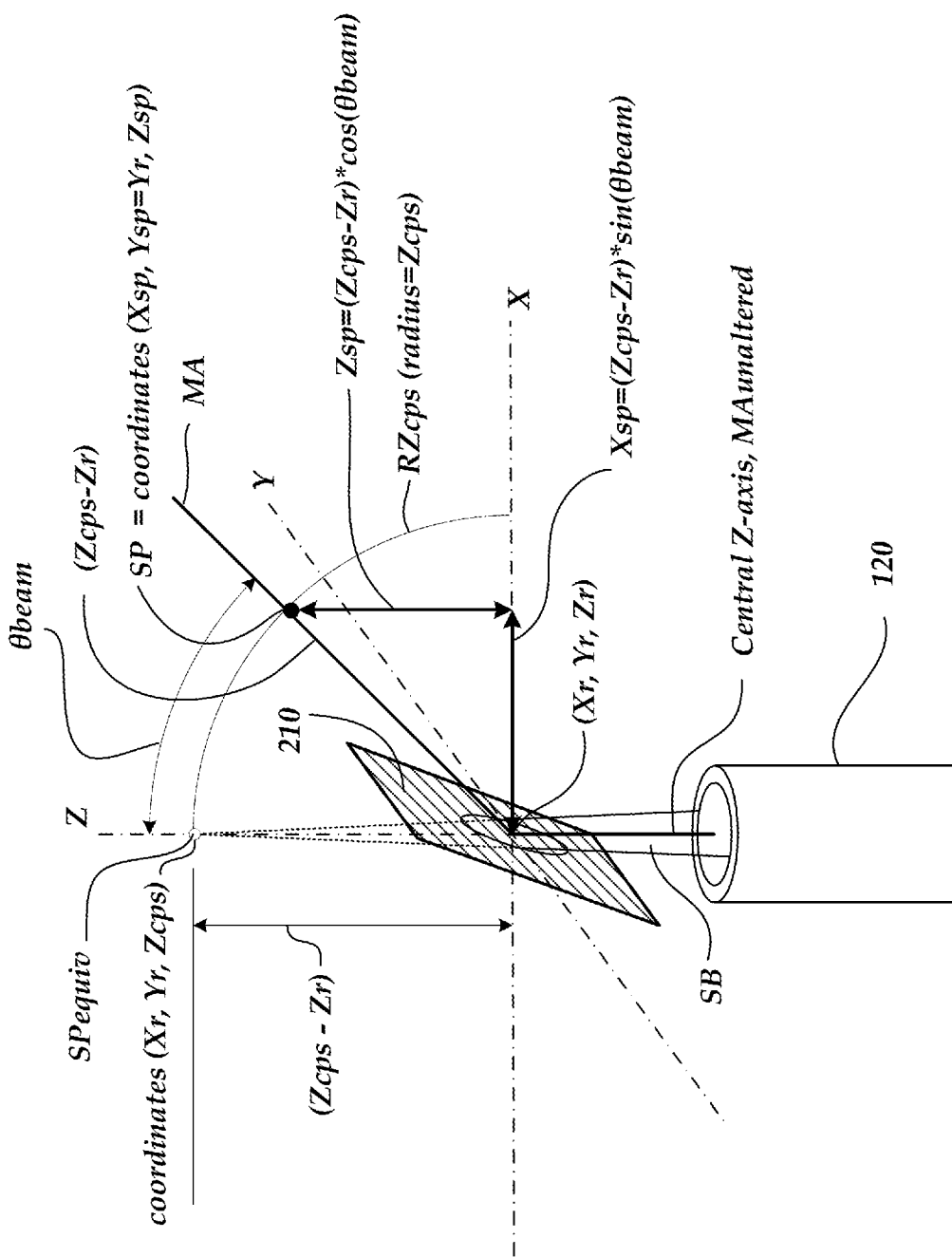
FIG. 10 is a diagram illustrating a coordinate system and various coordinate measurement considerations related to the geometric relationship between a measuring axis provided by a reflective assembly and the optical pen to which the reflective assembly is mounted.

FIG. 10 is a diagram illustrating a coordinate system and various coordinate measurement considerations related to the geometric relationship between a measuring axis MA provided by a reflective assembly (not shown), including a schematically represented reflective element 210, and the optical pen 120 to which the reflective assembly is mounted.

In the example measurement shown in FIG. 10, a measured surface point SP is shown along the measuring axis MA provided by the reflective element 210 of a reflective assembly. In this example, for the surface point SP the chromatic confocal point sensor system outputs a measurement peak (e.g., as previously outlined with reference to FIG. 3), which corresponds to a measurement distance Zcps according to a standard calibration and/or offset of the chromatic confocal point sensor system. FIG. 10 shows that the chromatic confocal point sensor system would output the same measurement distance Zcps for a surface point SPequiv located along the unaltered measuring axis MAunaltered (which is defined as identical to the central Z-axis in this example) in the absence of a reflective assembly and/or the reflective element 210. In the idealized case shown in FIG. 10, the unaltered measurement axis MAunaltered and/or the central Z-axis are taken to define the Z coordinate axis and the X-Y reference coordinates (Xr, Yr). We may determine reference coordinates (Xr, Yr, Zr) for a reflective assembly mounted to the optical pen 120, which correspond to an intersection point of the central Z-axis of the source beam SB with the reflective element 210 of a reflective assembly. According to the foregoing discussion of the features of FIG. 10, the optical path distance along the measuring axis MA must nominally be equal to (Zcps−Zr), as shown. In this example, for simplicity of explanation, the plane of the reflective element 210 is assumed to be parallel to the Y axis. Therefore, the measuring axis MA (and therefore the measured surface point SP) lies in the XZ plane. In such a case, when the chromatic confocal point sensor system outputs measurement value Zcps utilizing measurement axis MA provided by the reflective element 210, we may determine that the measured surface point SP is located at the coordinates (Xsp, Ysp=Yr, Zsp), where Xsp=(Zcps−Zr)*sin(θbeam), and Zsp=(Zcsp−Zr)*cos(θbeam), based on the foregoing discussion and known trigonometric relationships. It will be understood that if the plane of the reflective element 210 is not parallel to the y-axis, then the expressions for Xsp, Ysp and Zsp will be more complicated (e.g., including the effects of on an addition angle which characterizes the rotation angle of the reflective element 210 and/or the measuring axis MA about the Z-axis). Nevertheless, provided that the geometric relationship of the measuring axis MA to optical pen 120 is established (e.g., as outlined above), the three-dimensional coordinates of the surface point SP relative to the optical pen 120 may be established according to known mathematical methods. Such three-dimensional coordinates may be combined with an overall position of the chromatic confocal point sensor pen 120 (e.g., as established by a CMM which is used to mount and position the chromatic confocal point sensor pen 120).

In various implementations, the geometric relationship of a measuring axis MA to the optical pen (e.g., in terms of the reference coordinates Xr, Yr, Zr, and pertinent orientation angles of the measuring axis MA) may be established by design analysis, and/or known methods of experimental calibration, or the like. In one implementation, different reflective assemblies 200 may be interchangeably attached to the chromatic confocal point sensor 100. For each reflective assembly 200, calibration may be performed, so as to reduce potential measurement errors that could otherwise result as associated with the attachment and use of each individual reflective assembly 200. In some implementations each individual reflective assembly 200 may be rotated to a predetermined angle about the central Z-axis relative to the chromatic confocal point sensor, for which calibration methods may be performed for each of the predetermined angles. In any case, as outlined above, a reflective assembly and/or its measuring axis MA may, thus, be effectively provided with a kind of calibration information that may be used for reducing errors that would otherwise occur in a determined (x,y,z) coordinate of surface point on a workpiece. It will be appreciated that such calibration information or data is different from known types of calibration data that are separately provided for determining measurements along the unaltered measurement axis of the chromatic confocal point sensor pen when no reflective assembly is attached to it.

It will be appreciated that, according to known mathematical methods, determining and/or calibrating the geometric relationship of the measuring axis MA of the reflective assembly to the body and/or the central Z-axis of a chromatic confocal point sensor pen may be based on obtaining a plurality of respective measurements to a reference surface in the measuring range along the measuring axis MA using the reflective assembly, at a corresponding plurality of known or measured respective positions of the chromatic confocal point sensor pen relative to the reference surface. This may be particularly convenient in the case where the chromatic confocal point sensor pen is mounted on a coordinate measuring machine and the corresponding plurality of known or measured respective positions of the chromatic confocal point sensor pen relative to the reference surface are established by respective positions and corresponding measurements provided by the coordinate measurement machine.

The various embodiments described above can be combined to provide further embodiments. All of the U.S. patents and U.S. patent applications referred to in this specification are incorporated herein by reference, in their entirety. Aspects of the embodiments can be modified, if necessary to employ concepts of the various patents and applications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A first reflective assembly to be attached to a chromatic confocal point sensor pen which has a central Z-axis and which provides a source beam that continues along the direction of the central Z-axis in the absence of the reflective assembly, the first reflective assembly comprising:
   a mounting element configured to be attached to the chromatic confocal point sensor pen at a reflective assembly mounting feature included in the chromatic confocal point sensor pen; and
   a reflective element,
   wherein:
      the first reflective assembly is configured such that when the mounting element is operably attached to the chromatic confocal point sensor pen at the reflective assembly mounting feature:
         its reflective element is positioned in the source beam and reflects at least a portion of the source beam as a first measurement beam along a first measurement axis that is oriented relative to the direction of the central Z-axis at a first angle that is at least 10 degrees different from perpendicular to the central Z-axis; and
      the first reflective assembly is configured to output the first measurement beam along the first measurement axis to a workpiece portion, and to return workpiece measurement light arising from the first measurement beam reflecting back from the workpiece portion to the reflective element into the chromatic confocal point sensor pen.

2. The first reflective assembly of claim 1, wherein the first reflective assembly is configured such that a measuring range of the chromatic confocal point sensor pen along the first measurement axis extends beyond an end of the first reflective assembly as determined along the direction of the central Z-axis.

3. The first reflective assembly of claim 2, wherein the chromatic confocal point sensor pen comprises an optical assembly tube that extends along the central Z-axis, and the first reflective assembly is configured such that the measuring range of the chromatic confocal point sensor pen along the first measurement axis extends beyond a side of the optical assembly tube and a side of the first reflective assembly, as determined along a direction perpendicular to the central Z-axis.

4. The first reflective assembly of claim 1, wherein the first angle is at least 30 degrees different from perpendicular to the central Z-axis.

5. The first reflective assembly of claim 1, wherein the first angle is between 35 degrees and 55 degrees different from perpendicular to the central Z-axis.

6. The first reflective assembly of claim 1, wherein the first reflective assembly is included in a set reflective assemblies comprising at least a second reflective assembly having a mounting element configured to be mechanically interchangeable with the first reflective assembly for attachment to the chromatic confocal point sensor pen at the reflective assembly mounting feature, wherein the second reflective assembly comprises a reflective element, and is configured such that when its mounting element is operably attached to the chromatic confocal point sensor pen at the reflective assembly mounting feature:
   its reflective element is positioned in the source beam and reflects at least a portion of the source beam as a second measurement beam along a second measurement axis that is oriented relative to the direction of the central Z-axis at a second angle that is different than the first angle; and
   the second reflective assembly is configured to output the second measurement beam along the second measurement axis to a workpiece portion, and to return workpiece measurement light arising from the second measurement beam reflecting back from the workpiece portion to the reflective element into the chromatic confocal point sensor pen.

7. The first reflective assembly and the second reflective assembly of claim 6, wherein the second angle is substantially perpendicular to the central Z-axis.

8. The first reflective assembly and the second reflective assembly of claim 6, wherein the first angle and the second angle differ by more than 10 degrees and less than 80 degrees relative to one another.

9. The reflective assembly of claim 1, wherein the mounting element comprises a plurality of first alignment elements for seating against a mating plurality of second alignment elements included in the reflective assembly mounting feature of the chromatic confocal point sensor pen, and the first alignment elements and second alignment elements are configured to define a constrained rotational orientation of the reflective assembly relative to the chromatic confocal point sensor pen about the central Z-axis, when the first alignment elements are seating against the mating plurality of second alignment elements.

10. The reflective assembly of claim 9, wherein the first alignment elements and the second alignment elements are arranged such that the first alignment elements may be seated against a mating plurality of the second alignment elements for at least two different constrained rotational orientations of the reflective assembly relative to the chromatic confocal point sensor pen about the central Z-axis.

11. The reflective assembly of claim 9, wherein one of a mating first alignment element and second alignment element comprises a receiving portion, and the other of the mating first alignment element and second alignment element comprises an extended portion that seats against an interior surface of the receiving portion.

12. The reflective assembly of claim 1, wherein at least one of the mounting element and the reflective assembly mounting feature comprises at least one magnet configured to magnetically force the mounting element against the reflective assembly mounting feature.

13. A method for operating a chromatic confocal point sensor pen to measure a distance to a workpiece portion that is located away from a central Z-axis of the chromatic confocal point sensor pen and along a measurement axis that is oriented relative to the direction of the central Z-axis at an angle that is at least 10 degrees different from perpendicular to the central Z-axis, the method comprising:
providing a chromatic confocal point sensor pen which has a central Z-axis and which provides a source beam that continues along the direction of the central Z-axis in the absence of a reflective assembly;
providing a first reflective assembly comprising:
a mounting element configured to be attached to the chromatic confocal point sensor pen at a reflective assembly mounting feature included in the chromatic confocal point sensor pen, and
a reflective element;
operably attaching the mounting element to the chromatic confocal point sensor pen at the reflective assembly mounting feature such that the reflective element is positioned in the source beam;
using the reflective element to reflect at least a portion of the source beam as a first measurement beam along a first measurement axis that is oriented relative to the direction of the central Z-axis at a first angle that is at least 10 degrees different from perpendicular to the central Z-axis; and
outputting the first measurement beam along the first measurement axis to a workpiece portion, and returning workpiece measurement light arising from the first measurement beam reflecting back from the workpiece portion to the reflective element into the chromatic confocal point sensor pen.

14. The method of claim 13, wherein the provided first reflective assembly is configured such that a measuring range of the chromatic confocal point sensor pen along the first measurement axis extends beyond an end of the first reflective assembly as determined along the direction of the central Z-axis.

15. The method of claim 14, further comprising using the method to determine measurements usable to establish a surface profile in the vicinity of an intersection between a sidewall and an end surface of a hole or cavity.

16. The method of claim 14, wherein the chromatic confocal point sensor pen comprises an optical assembly tube that extends along the central Z-axis, and the first reflective assembly is configured such that the measuring range of the chromatic confocal point sensor pen along the first measurement axis extends beyond an end of the first reflective assembly and a side of the optical assembly tube, as determined along a direction perpendicular to the central Z-axis.

17. The method of claim 13, further comprising determining an (x,y,z) coordinate measurement of the workpiece portion, based at least partially on a position of the chromatic confocal point sensor pen, a measurement within the measuring range of the measuring range of the chromatic confocal point sensor pen along the first measurement axis, and the geometric relationship of the first measuring axis to the central Z-axis of the chromatic confocal point sensor pen.

18. The method of claim 17, further comprising providing reflective assembly calibration data that characterizes errors in coordinate measurements obtained using the first reflective assembly, and using the calibration data for reducing errors that would otherwise occur in the determined (x,y,z) coordinate of the workpiece portion.

19. The method of claim 18, wherein the reflective assembly calibration data is different from calibration data that is separately provided for determining measurements along the unaltered measurement axis of the chromatic confocal point sensor pen when no reflective assembly is attached to it.

20. The method of claim 17, further comprising determining the geometric relationship of the first measuring axis to the central Z-axis of the chromatic confocal point sensor pen based on a plurality of respective measurements to a reference surface in the measuring range using the first reflective assembly, at a corresponding plurality of known or measured respective positions of the chromatic confocal point sensor pen relative to the reference surface.

21. The method of claim 20, wherein the chromatic confocal point sensor pen is mounted on a coordinate measuring machine and the corresponding plurality of known or measured respective positions of the chromatic confocal point sensor pen relative to the reference surface are established by respective positions and corresponding measurements provided by the coordinate measurement machine.

22. The method of claim 13, wherein the first angle is at least 30 degrees different from perpendicular to the central Z-axis.

23. The method of claim 13, wherein the first angle is between 35 degrees and 55 degrees different from perpendicular to the central Z-axis.

* * * * *